UNITED STATES PATENT OFFICE.

ALFRED THOMAS, OF HOWARD, PENNSYLVANIA.

IMPROVEMENT IN THE MANUFACTURE OF IRON.

Specification forming part of Letters Patent No. 23,512, dated April 5, 1859.

*To all whom it may concern:*

Be it known that I, ALFRED THOMAS, of Howard Iron Works, in the county of Centre and State of Pennsylvania, have discovered and invented a new and Improved Process or Mixture of Metals and Cinder for Making Malleable Iron; and I do hereby declare that the following is a full and exact description thereof.

To enable others skilled in the art to make and use my invention, I will proceed to describe the same as I have successfully practiced it.

Ores and metals have been mixed in many ways and in diverse proportions, with a view of improving the quality of the product, and with considerable success; but this is not my invention. I mix two kinds of iron—viz., charcoal metal and anthracite metal—in certain proportions, but this, of itself, will not produce the quality of iron which I allege to have produced by my new process; but I go further and add to the charcoal and anthracite iron, which are respectively a "slight red-short" and a "high cold-short," an article known as "forge-cinder" in certain proportions, which produces an article of iron far superior to any hitherto known. The mixing of forge-cinder with either charcoal iron or anthracite iron will not produce the metal that these two metals combined with the forge-cinder will do. Forge-cinder is at present deemed of little or no value and incumbers many furnaces. It is rich in metal, but has not been worked with any degree of economy that would justify its use. Now, in my process I use about twenty per cent. of this forge-cinder, which makes these cinder-banks valuable. Forge-cinder is an article well known to manufacturers of iron; but to distinguish it more particularly from cinder generally, with which it might be confounded, I would state that what is known and meant by "forge-cinder" is produced by what is termed the "refining process"—that is, by reducing charcoal metal with charcoal as a fuel. The cinder is tapped and run from the "loop" after the iron has "revived" and "come to nature," as it is termed, and a considerable portion of iron is always carried off with the cinder; but it is seldom, if ever, reworked, and large banks of it are lying a useless waste around old forges. It is this article of forge-cinder which I use and mix with the charcoal metal and anthracite metal to produce the article of iron which I have discovered.

My invention consists in the mixing of charcoal metal and anthracite metal and forge-cinder in certain proportions for the purpose of making a malleable iron which has many highly valuable properties.

In practice I find that the requisite proportions of the ingredients are about as follows, viz: thirteen parts of charcoal metal, twenty-nine parts of anthracite metal, ten parts of forge-cinder. These proportions may be varied somewhat, and the metal named need not be, or may not be, made exclusively of charcoal or anthracite, but of mixtures of each as a fuel without changing the characteristics of my discovery; and so long as the forge-cinder is utilized and mixed with red and cold short iron to improve the quality of the whole I should deem it as involving my invention. When these ingredients are properly apportioned and mixed they are charged into a puddling or boiling furnace, and by thoroughly amalgamating the mass wrought-iron is produced of the very best quality, and far superior to any that can be made from either of the parts separately, or by any other mixture or process of which I have knowledge, the product partaking of neither the red short of the charcoal metal nor of the cold-short of the anthracite, but is seemingly neutralized by the mixture of the forge-cinder with them, the forge-cinder being high red-short metal—that is, the metal that is in it, as it is produced in refining iron by charcoal.

The article which I produce by the above mixture for fineness of quality is but little inferior to steel. The ingredients are named as those known in the trade, but it is their peculiar propert'es which constitute the great element.

What I claim as my invention, and desire to secure by Letters Patent, is—

The mixing of charcoal and anthracite metal and forge-cinder in the proportions substantially as herein stated, and working them together in the puddling or boiling process, or in a refinery-fire for the purpose of making a superior quality of iron, as herein stated.

ALFRED THOMAS.

Witnesses:
 ADAM CRISSMAN,
 W. E. IRWIN.